United States Patent
Park et al.

(10) Patent No.: US 11,847,837 B2
(45) Date of Patent: Dec. 19, 2023

(54) IMAGE-BASED LANE DETECTION AND EGO-LANE RECOGNITION METHOD AND APPARATUS

(71) Applicant: Korea Electronics Technology Institute, Seongnam-si (KR)

(72) Inventors: Min Gyu Park, Seoul (KR); Ju Hong Yoon, Sejong-si (KR); Je Woo Kim, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 487 days.

(21) Appl. No.: 17/137,832

(22) Filed: Dec. 30, 2020

(65) Prior Publication Data
US 2021/0334553 A1   Oct. 28, 2021

(30) Foreign Application Priority Data

Apr. 27, 2020 (KR) .................. 10-2020-0050966

(51) Int. Cl.
  *G06V 20/56* (2022.01)
  *G06N 20/00* (2019.01)
  *G06N 3/084* (2023.01)
  *G06N 3/045* (2023.01)

(52) U.S. Cl.
  CPC ........... *G06V 20/588* (2022.01); *G06N 3/045* (2023.01); *G06N 3/084* (2013.01); *G06N 20/00* (2019.01)

(58) Field of Classification Search
  CPC ........ G06V 20/58; G06V 10/46; G06N 3/045; G06N 3/084; G06N 20/00; G06T 7/11; G06T 2207/20084; G06T 2207/30256
  See application file for complete search history.

(56) References Cited

U.S. PATENT DOCUMENTS

| | | | |
|---|---|---|---|
| 8,537,338 B1* | 9/2013 | Medasani | G01S 7/4802 382/104 |
| 10,102,434 B2* | 10/2018 | Yang | G06T 7/11 |
| 2017/0147891 A1* | 5/2017 | Satzoda | G06V 20/588 |
| 2019/0258251 A1* | 8/2019 | Ditty | G05D 1/0248 |
| 2019/0310648 A1* | 10/2019 | Yang | G06N 20/00 |
| 2020/0026283 A1* | 1/2020 | Barnes | G06V 20/58 |
| 2020/0058218 A1* | 2/2020 | Julian | G06V 20/56 |
| 2020/0074266 A1* | 3/2020 | Peake | G06F 18/2411 |

(Continued)

OTHER PUBLICATIONS

Jeong, Seung Gweon et al., Real-Time Lane Detection for Autonomous Vehicle, 2001, IEEE, ISIE 2001, 1466-1471 (Year: 2001).*

*Primary Examiner* — Lewis G West
(74) *Attorney, Agent, or Firm* — Hauptman Ham, LLP

(57) ABSTRACT

A method and an apparatus for detecting a lane is provided. The lane detection apparatus according to an embodiment includes: an acquisition unit configured to acquire a front image of a vehicle; and a processor configured to input the image acquired through the acquisition unit to an AI model, and to detect information of a lane on a road, and the AI model is trained to detect lane information that is expressed in a plane form from an input image. Accordingly, data imbalance between a lane area and a non-lane area can be solved by using the AI model which learns/predicts lane information that is expressed in a plane form, not in a segment form such as a straight line or curved line.

7 Claims, 4 Drawing Sheets

(56) References Cited

U.S. PATENT DOCUMENTS

| | | | | |
|---|---|---|---|---|
| 2020/0218913 | A1* | 7/2020 | Unnikrishnan | G01S 13/867 |
| 2020/0249684 | A1* | 8/2020 | Onofrio | G05D 1/0219 |
| 2020/0372285 | A1* | 11/2020 | Adams | G06N 3/084 |
| 2021/0042535 | A1* | 2/2021 | Abbott | G06T 7/73 |
| 2021/0049780 | A1* | 2/2021 | Westmacot | G01C 21/3819 |
| 2021/0182596 | A1* | 6/2021 | Adams | G06V 20/588 |
| 2021/0232851 | A1* | 7/2021 | Redford | G06V 20/588 |
| 2021/0248392 | A1* | 8/2021 | Zaheer | G06N 7/01 |
| 2021/0334553 | A1* | 10/2021 | Park | G06N 20/00 |
| 2021/0342600 | A1* | 11/2021 | Westmacott | G06F 18/2148 |
| 2022/0292846 | A1* | 9/2022 | Tamura | G06V 20/588 |
| 2023/0148097 | A1* | 5/2023 | Miyake | G01S 13/867 |
| | | | | 348/148 |
| 2023/0192081 | A1* | 6/2023 | Lengsfeld | B60W 30/14 |
| | | | | 701/93 |

* cited by examiner

IMAGE-BASED LANE DETECTION AND EGO-LANE RECOGNITION METHOD AND APPARATUS

CROSS-REFERENCE TO RELATED APPLICATION(S) AND CLAIM OF PRIORITY

This application is based on and claims priority under 35 U.S.C. § 119 to Korean Patent Application No. 10-2020-0050966, filed on Apr. 27, 2020, in the Korean Intellectual Property Office, the disclosure of which is herein incorporated by reference in its entirety.

BACKGROUND

Field

The present disclosure relates generally to artificial intelligent (AI) technology, and more particularly, to a method and an apparatus for detecting a lane from a front image of a vehicle and recognizing an ego-lane of the vehicle by using an AI model.

Description of Related Art

The top priority prerequisite for essential functions in autonomous driving, such as lane departure warning, lane keeping assist system, adaptive cruise control, is lane detection.

With the development of AI technology, deep learning-based lane detection algorithms are increasingly used. These algorithms employ an approach method of acquiring ground truth regarding a lane in a curved line or straight line form, and learning whether there is a lane area from a deep learning model. A result of acquiring lane information according to these algorithms is illustrated in FIG. 1.

However, in this method, the number of pixels corresponding to non-lane areas is overwhelmingly larger than those of lane areas, and thus training data is unbalanced, and accordingly, there is a problem that prediction performance is degraded.

SUMMARY

To address the above-discussed deficiencies of the prior art, it is a primary object of the present disclosure to provide a method and an apparatus for detecting a lane based on an image by using an AI model, which learns/predicts lane information that is expressed in a plane form, not in a segment form such as a straight line or a curved line.

In addition, another object of the present disclosure is to provide a method and an apparatus for recognizing an ego-lane of a vehicle based on an AI models which learns/predicts lane information that is expressed in a plane form.

According to an embodiment of the present disclosure to achieve the above-described objects, a lane detection apparatus includes: an acquisition unit configured to acquire a front image of a vehicle; and a processor configured to input the image acquired through the acquisition unit to an AI model, and to detect information of a lane on a road, wherein the AI model is trained to detect lane information that is expressed in a plane form from an input image.

The lane information detected by the AI model may not be expressed in a segment form.

The lane information may be expressed by boundaries of roads.

The AI model may be configured to express the lane information with respect to all road areas of the input image.

The AI model may include: a first network which is trained to extract features from the input image; and a second network which is trained to detect the lane information from the features extracted by the first network.

The AI model may be trained to recognize an ego-lane of the vehicle from the detected lanes.

According to the present disclosure, the lane detection apparatus may further include a third network which is trained to recognize the ego-lane from the features extracted by the first network.

A loss function used for back propagation learning of the AI model may include a function for calculating whether pixels of the input image indicate the ego-lane or a nearby lane of the ego-lane, and a function that forces to increase a possibility that neighboring pixels have the same level.

The loss function used for the back propagation learning of the AI model further may further include a function for calculating whether there exists a lane.

According to another aspect of the present disclosure, a lane detection method includes: acquiring a front image of a vehicle; and inputting the acquired image to an AI model, and detecting information of a lane on a road, wherein the AI model is trained to detect lane information that is expressed in a plane form from an input image.

According to still another aspect of the present disclosure, a lane detection apparatus includes: a processor configured to input a front image of a vehicle to an AI model, and to detect information of a lane on a road; and an output unit configured to output the lane information detected by the processor, wherein the AI model is trained to detect lane information that is expressed in a plane form from an input image.

According to yet another aspect of the present disclosure, a lane detection method includes: inputting a front image of a vehicle to an AI model, and detecting information of a lane on a road; and outputting the detected lane information, wherein the AI model is trained to detect lane information that is expressed in a plane form from an input image.

According to embodiments of the present disclosure as described above, data imbalance between a lane area and a non-lane area can be solved by using the AI model which learns/predicts lane information that is expressed in a plane form, not in a segment form such as a straight line or curved line.

Accordingly, high performance in detection of lane information on a road and recognition of an ego-lane can be achieved, and it is possible to detect a lane and recognize an ego-lane exactly even when the lane is disconnected.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the present disclosure will be described in detail with reference to the accompanying drawings.

Embodiments of the present disclosure suggest a method for detecting a lane on a road, and simultaneously, recognizing an ego-lane of the vehicle, based on a front image of a vehicle by using an AI model.

Since there is no limitation on a channel of the front image, it is possible to detect and recognize a lane not only from a front image of a single channel but also from a front image of multiple channels. In addition, there is no limitation on the number of lanes detectable.

Furthermore, there is no limitation on the AI model. Not only a deep learning model but also other neural networks, and furthermore, AI models of other types may be trained to detect and recognize a lane.

The AI model applicable to embodiments of the present disclosure is trained to detect/predict lane information that is expressed in a plane form, not in a segment form, from a front image of a vehicle.

Figure 1:
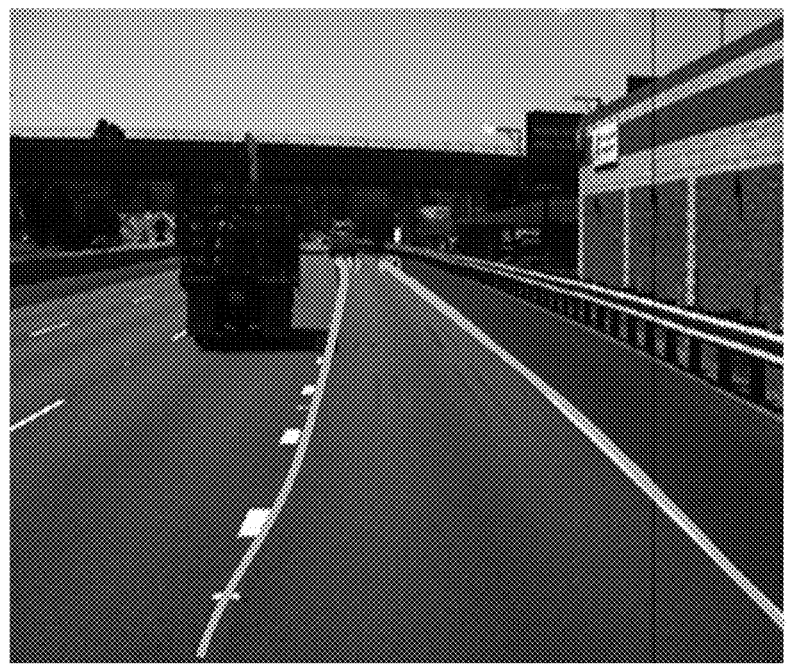
FIG. 1 is a view provided to explain related-art lane detection technology.
Figure 2:
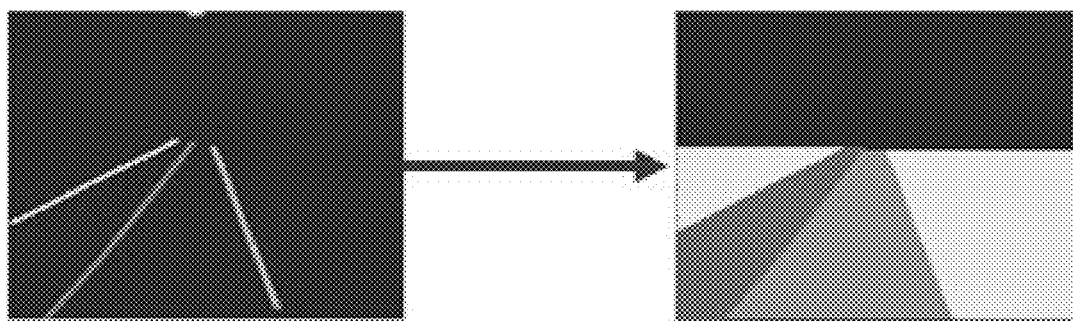
FIG. 2 is a view provided to explain a learning image of an AI model applicable to an embodiment of the present disclosure.

To achieve this, the AI model applicable to embodiments of the present disclosure may convert an image that expresses lane information in a segment form as shown on the left of FIG. 2 into an image that expresses lane information in a plane form, that is, in the form of boundaries of roads, as shown in the right of FIG. 2, and may use the converted image as a learning image.

As can be seen from the drawing, lane information regarding all road areas of a front image of a vehicle may be expressed in the learning image having the above-described form. Accordingly, degradation of prediction performance, caused by the imbalance of the number of pixels between a lane area and a non-lane area as in the learning image expressing the lane information in the segment form, can be prevented.

The AI model applicable to embodiments of the present disclosure outputs lane information that is expressed in a plane form like a road, not in a segment form like a lane, in detecting the lane information from the vehicle front image. Boundaries of the roads expressed in the outputted lane information may be dealt with as lanes.

Furthermore, the AI model applicable to embodiments of the present disclosure is trained to recognize an ego-lane of the vehicle. Accordingly, the AI model applicable to embodiments of the present disclosure may recognize the ego-lane of the vehicle and may express the ego-lane in a different color from the other lanes.

Figure 3:
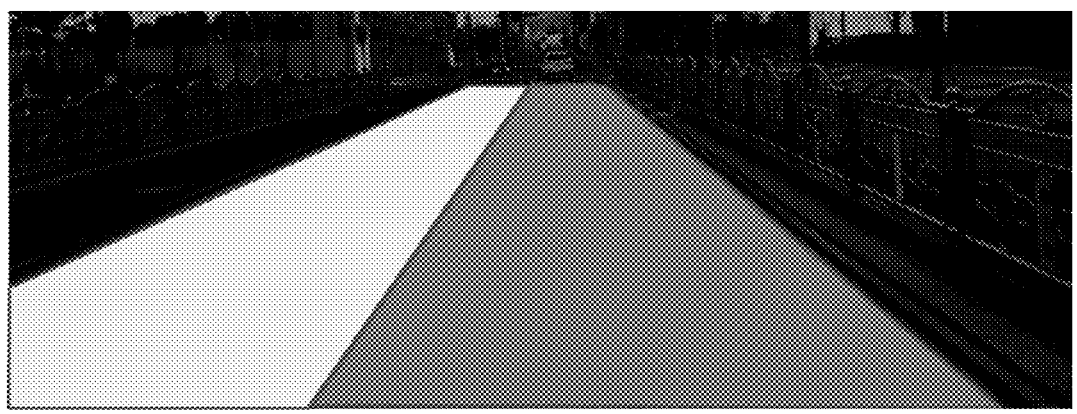
FIG. 3 is a view illustrating a result of detecting a lane and recognizing an ego-lane by an AI model applicable to an embodiment of the present disclosure.

FIG. 3 illustrates a result of detecting lane information in a plane form from a real vehicle front image by the AI model applicable to embodiments of the present disclosure.

As shown in FIG. 3, the AI model applicable to embodiments of the present disclosure may detect lane information that is expressed in a plane form like a road, not in a segment form like a lane, from the vehicle front image inputted. That is, the lane information may be expressed by two planes (roads), not by three segments.

In addition, it can be identified that the ego-lane is expressed in green and the left lane of the ego-lane is expressed in blue.

Figure 4:
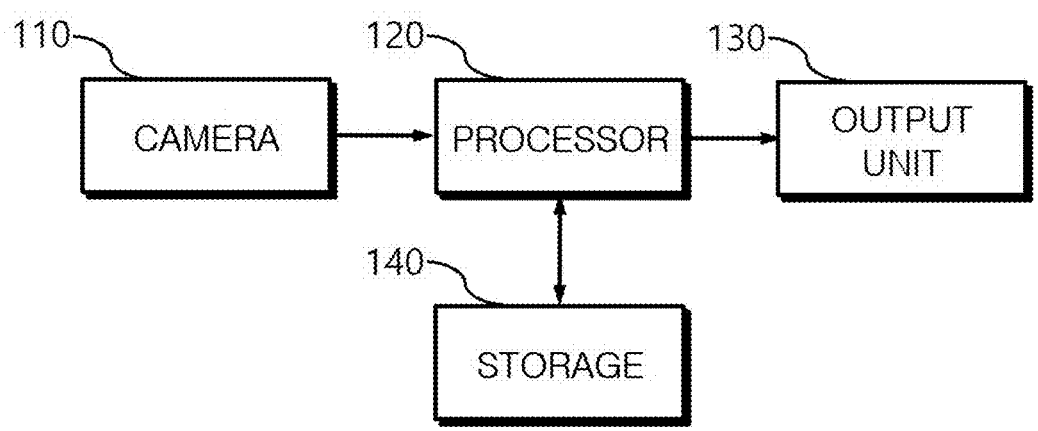
FIG. 4 is a block diagram of an apparatus for detecting a lane and a recognizing an ego-lane according to an embodiment of the present disclosure.

A configuration of hardware of an apparatus for detecting a lane and recognizing an ego-lane to which the above-described AI model is applied is illustrated in FIG. 4. FIG. 4 is a block diagram of the apparatus for detecting the lane and recognizing the ego-lane according to an embodiment of the present disclosure.

The apparatus for detecting the lane and recognizing the ego-lane according to an embodiment of the present disclosure may include a camera 110, a processor 120, an output unit 130, and a storage 140 as shown in FIG. 4.

The camera 110 is an image acquiring means that is attached to a vehicle to create an image by photographing a front of the vehicle. The camera 110 may be implemented by a single camera, but is not limited thereto, and the camera 110 may be implemented by using cameras of other types.

The processor 120 may include graphic processing units (GPUs) and central processing units (CPUs) to execute the above-described AI model which is trained to receive the front image of the vehicle acquired through the camera 110, to detect a lane on a road, and to recognize a current ego-lane.

The output unit 130 may be a means for transmitting a result of estimating/predicting by the AI model to other components, which are not illustrated, for example, a navigation system, an electronic control unit (ECU), a display, a communication module, etc.

The storage 140 provides a storage space necessary for operating the apparatus for detecting the lane and recognizing the ego-lane according to an embodiment of the present disclosure.

Figure 5:
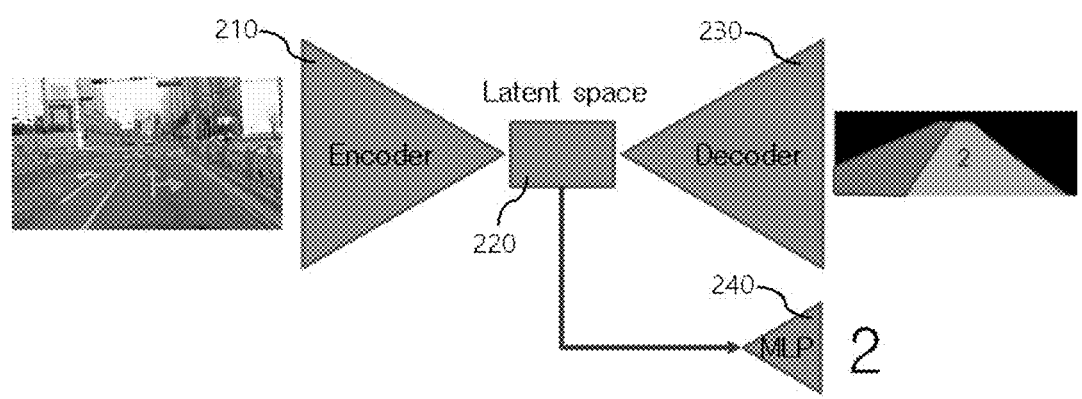
FIG. 5 is a view illustrating a structure of an AI model applicable to an embodiment of the present disclosure.

Functions of the AI model executed by the processor 120 have been described above. FIG. 5 illustrates a structure of the AI model. As shown in FIG. 5, the AI model may include an encoder network 210, a latent space 220, a decoder network 230, and a multi-layer perceptron (MLP) 240.

The encoder network 210 is a network that is trained to extract features from the vehicle front image created by the camera 110, and to configure the latent space 220.

The decoder network 230 is a network that is trained to detect lane information from the features of the latent space 220 configured by the encoder network 210.

The MLP 240 is a network that is trained to recognize ego-lane information from the features of the latent space 220 configured by the encoder network 210.

Changes may be made to the configuration of the AI model when necessary. For example, the MLP 240 may be omitted when it is not necessary to recognize the ego-lane, and the decoder network 230 may be omitted when the AI model intends only to recognize the ego-lane without detecting lane information after being trained.

A loss function (L) used for back propagation learning of the AI model may be comprised of three sub functions ($L_{data}$, $L_{smooth}$, $L_{exist}$) as shown in Equation presented below. $\lambda_1$ is a weight of the second sub function $L_{smooth}$, and $\lambda_2$ is a weight of the third sub function $L_{exist}$.

$$L = L_{data} + \lambda_1 L_{smooth} + \lambda_2 L_{exist}$$

The first sub function $L_{data}$ is a data function, and is a loss function that calculates whether predicted pixels indicate an ego-lane or a left/right road by using a value of 0 or 1. Since the lane information is expressed in the plane form like a road, the AI model applied to embodiments of the present disclosure may acquire a loss by using ground truth of a plane form by the data function.

The second sub function $L_{smooth}$ is a flattening function that is expressed by the following equation, and is a function that forces to increase a possibility that neighboring pixels have the same level.

$$L_{smooth} = \Sigma_p \Sigma_{q \in N_p} \delta(p,q)$$

Accordingly, a prediction value can be prevented from being frequently changed and a reliable prediction value can be obtained.

The third sub function $L_{exist}$ is a loss function that calculates whether there exists a lane by using a value of 0 or 1. For example, if the maximum number of roads that can be recognized by the AI model is 7, "1100000" may be calculated when there exist two lanes, and "1111100" may be calculated when there exist five lanes.

The loss function (L) suggested above is merely an example and is changeable. For example, the third sub function $L_{exist}$ may be omitted and the loss function may be defined as shown in the following Equation:

$$L = L_{data} + \lambda L_{smooth}$$

Up to now, the method and the apparatus for detecting the lane and recognizing the ego-lane have been described in detail with reference to preferred embodiments.

Figure 6:
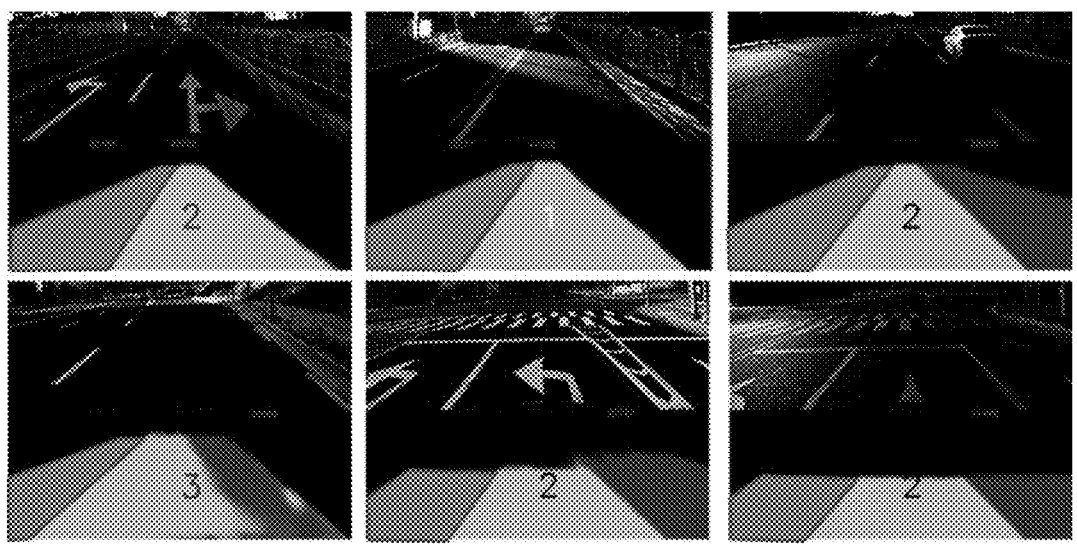
FIG. 6 is a view illustrating results of detecting a lane and recognizing an ego-lane by the method and the apparatus according to an embodiment of the present disclosure.

Results of detecting a lane and recognizing an ego-lane according to the method and the apparatus according to an embodiment of the present disclosure are illustrated in FIG. 6.

In the above-described embodiments, it is assumed that information learned/predicted through the AI model is lane information and ego-lane information. However, the AI model may be implemented to learn/predict more relevant information.

For example, the technical concept of the present disclosure can be applied when the AI model is implemented to learn/predict whether a lane is a lane of a broken line type or a lane of a solid line type, and to learn/predict whether a lane is a lane of a white line type or a lane of a yellow line type.

The method and the apparatus for detecting the lane and recognizing the ego-lane according to an embodiment of the present disclosure may be mounted in an advanced driver assistance system or an autonomous driving system for the sake of lane departure warning, a lane keeping assist system, an adaptive cruise control.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A lane detection apparatus comprising:
    an acquisition unit configured to acquire a front image of a vehicle; and
    a processor configured to input the image acquired through the acquisition unit to an AI model, and to detect information of a lane on a road,
    wherein the AI model is trained to detect lane information that is expressed in a plane form from an input image,
    wherein the AI model comprises:
        a first network which is trained to extract features from the input image;
        a second network which is trained to detect the lane information from the features extracted by the first network; and
        a third network which is trained to recognize an ego-lane of the vehicle from the features extracted by the first network,
    wherein the AI model is trained to recognize the ego-lane of the vehicle from the detected lanes, and
    wherein a loss function used for back propagation learning of the AI model comprises a function for calculating whether pixels of the input image indicate the ego-lane or a nearby lane of the ego-lane, and a function that forces to increase a possibility that neighboring pixels have the same level.

2. The lane detection apparatus of claim 1, wherein the lane information detected by the AI model is not expressed in a segment form.

3. The lane detection apparatus of claim 2, wherein the lane information is expressed by boundaries of roads.

4. The lane detection apparatus of claim 1, wherein the AI model is configured to express the lane information with respect to all road areas of the input image.

5. The lane detection apparatus of claim 1, wherein the loss function used for the back propagation learning of the AI model further comprises a function for calculating whether there exists a lane.

6. A lane detection method comprising:
    acquiring a front image of a vehicle; and
    inputting the acquired image to an AI model, and detecting information of a lane on a road, wherein the AI model is trained to detect lane information that is expressed in a plane form from an input image,
wherein the AI model comprises:
- a first network which is trained to extract features from the input image;
- a second network which is trained to detect the lane information from the features extracted by the first network; and
- a third network which is trained to recognize an ego-lane of the vehicle from the features extracted by the first network, wherein the AI model is trained to recognize the ego-lane of the vehicle from the detected lanes, and
wherein a loss function used for back propagation learning of the AI model comprises a function for calculating whether pixels of the input image indicate the ego-lane or a nearby lane of the ego-lane, and a function that forces to increase a possibility that neighboring pixels have the same level.

7. A lane detection apparatus comprising:
a processor configured to input a front image of a vehicle to an AI model, and to detect information of a lane on a road; and
an output unit configured to output the lane information detected by the processor,
wherein the AI model is trained to detect lane information that is expressed in a plane form from an input image,
wherein the AI model comprises:
- a first network which is trained to extract features from the input image;
- a second network which is trained to detect the lane information from the features extracted by the first network; and
- a third network which is trained to recognize an ego-lane of the vehicle from the features extracted by the first network, wherein the AI model is trained to recognize the ego-lane of the vehicle from the detected lanes, and
wherein a loss function used for back propagation learning of the AI model comprises a function for calculating whether pixels of the input image indicate the ego-lane or a nearby lane of the ego-lane, and a function that forces to increase a possibility that neighboring pixels have the same level.

* * * * *